(12) United States Patent
Wen et al.

(10) Patent No.: US 12,450,598 B2
(45) Date of Patent: Oct. 21, 2025

(54) SMART CONTRACT FOR INBOUND TRANSACTIONS

(71) Applicant: Coinbase, Inc., Oakland, CA (US)

(72) Inventors: Hao Wen, Bothell, WA (US); Jiangchuan He, Redmond, WA (US); Nate Welch, Portland, ME (US); Hui Xie, Vancouver (CA); Vignesh Muralidharan, Seattle, WA (US); Rajeev Vishaka, Austin, TX (US)

( * ) Notice: Subject to any disclaimer, the term of this patent is extended or adjusted under 35 U.S.C. 154(b) by 188 days.

(21) Appl. No.: 18/070,300

(22) Filed: Nov. 28, 2022

(65) Prior Publication Data

US 2024/0177147 A1 May 30, 2024

(51) Int. Cl.
 *G06Q 20/38* (2012.01)
 *G06Q 20/40* (2012.01)

(52) U.S. Cl.
 CPC ... *G06Q 20/3825* (2013.01); *G06Q 20/38215* (2013.01); *G06Q 20/4014* (2013.01)

(58) Field of Classification Search
 CPC ......... G06Q 20/3825; G06Q 20/38215; G06Q 20/4014
 See application file for complete search history.

(56) References Cited

U.S. PATENT DOCUMENTS

| | | | | |
|---|---|---|---|---|
| 11,139,955 B1* | 10/2021 | So | ................ | G06Q 20/3674 |
| 11,308,487 B1* | 4/2022 | Foster | ................ | G06Q 20/3829 |
| 11,315,115 B2* | 4/2022 | Zhou | ................ | G06Q 20/389 |
| 11,615,409 B1* | 3/2023 | Rehm | ................ | G06Q 20/10 |
| | | | | 705/71 |
| 12,093,942 B1* | 9/2024 | Auerbach | .......... | G06Q 20/3829 |
| 2019/0081789 A1* | 3/2019 | Madisetti | .............. | H04L 9/0637 |
| 2019/0228409 A1* | 7/2019 | Madisetti | .............. | G06Q 40/03 |
| 2019/0303892 A1* | 10/2019 | Yantis | ................ | G06Q 20/3825 |
| 2019/0340689 A1* | 11/2019 | Gordon, III | ....... | G06Q 20/3678 |
| 2020/0058023 A1* | 2/2020 | Travizano | ............. | H04L 9/3239 |
| 2020/0267020 A1* | 8/2020 | Doney | ................ | G06F 16/9024 |

(Continued)

OTHER PUBLICATIONS

Chaparala et al., LiftChain: A Scalable Multi-Stage NFT Transaction Protocol, 2022, IEEE, 2022 IEEE International Conference on Blockchain, pp. 362-369 (Year: 2022).*

(Continued)

*Primary Examiner* — John W Hayes
*Assistant Examiner* — Yingying Zhou
(74) *Attorney, Agent, or Firm* — Holland & Hart LLP

(57) ABSTRACT

A custodial token platform may implement smart contracts for inbound transactions and flush transactions. The platform may deploy to a blockchain ledger, a plurality of inbound smart contracts, including first inbound smart contract for a first user of a plurality of users of a custodial token platform. The plurality of smart contracts may include a second inbound smart contract for a second user of the plurality of users of the custodial token platform. The platform may deploy a batch smart contract configured to control the plurality of inbound smart contracts. The platform may broadcast a transaction that calls the batch smart contract. The transaction causes a transfer of the first set of one or more crypto tokens of the first inbound smart contract and the second set of one or more crypto tokens of the second inbound smart contract to an outbound address of the custodial token platform.

14 Claims, 13 Drawing Sheets

(56) References Cited

U.S. PATENT DOCUMENTS

| | | | | |
|---|---|---|---|---|
| 2020/0342539 | A1* | 10/2020 | Doney | G06Q 20/3829 |
| 2021/0124722 | A1* | 4/2021 | Srivastava | H04L 9/3236 |
| 2021/0352139 | A1* | 11/2021 | Madisetti | H04L 9/50 |
| 2022/0076334 | A1* | 3/2022 | Filter | H04L 9/3213 |
| 2022/0092562 | A1* | 3/2022 | Long | G06Q 20/0658 |
| 2022/0188819 | A1* | 6/2022 | Ognjanovic | H04L 9/3236 |
| 2022/0207022 | A1* | 6/2022 | Wood | G06F 16/2379 |
| 2022/0311595 | A1* | 9/2022 | Vukolic | G06F 9/466 |
| 2022/0385499 | A1* | 12/2022 | Doney | G06F 16/2379 |
| 2023/0186301 | A1* | 6/2023 | Enneking | G06Q 20/0655 |
| | | | | 705/44 |
| 2023/0385822 | A1* | 11/2023 | Shanmugam | G06Q 20/02 |
| 2023/0396445 | A1* | 12/2023 | Padmanabhan | G06F 21/6218 |
| 2024/0086873 | A1* | 3/2024 | Riva | G06Q 20/0655 |
| 2024/0152915 | A1* | 5/2024 | Canney | G06Q 20/065 |
| 2024/0177147 | A1* | 5/2024 | Wen | G06Q 20/4014 |
| 2024/0193684 | A1* | 6/2024 | Bai | G06Q 30/018 |

OTHER PUBLICATIONS

Wang et al.; Enabling Cost-Effective Blockchain Applications via Workload-adaptive Transaction Execution; Oct. 7, 2022; arXiv; https://arxiv.org/pdf/2210.04644 (Year: 2022).*

Wang et al., iBatch: Saving Ethereum Fees via Secure and Cost-effective Batching of Smart-Contract Invocations; Aug. 23-28, 2021; ACM ESEC/FSE' 21, pp. 566-577 (Year: 2021).*

* cited by examiner

SMART CONTRACT FOR INBOUND TRANSACTIONS

FIELD OF TECHNOLOGY

The present disclosure relates generally to token management, and more specifically to smart contract for inbound transactions.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
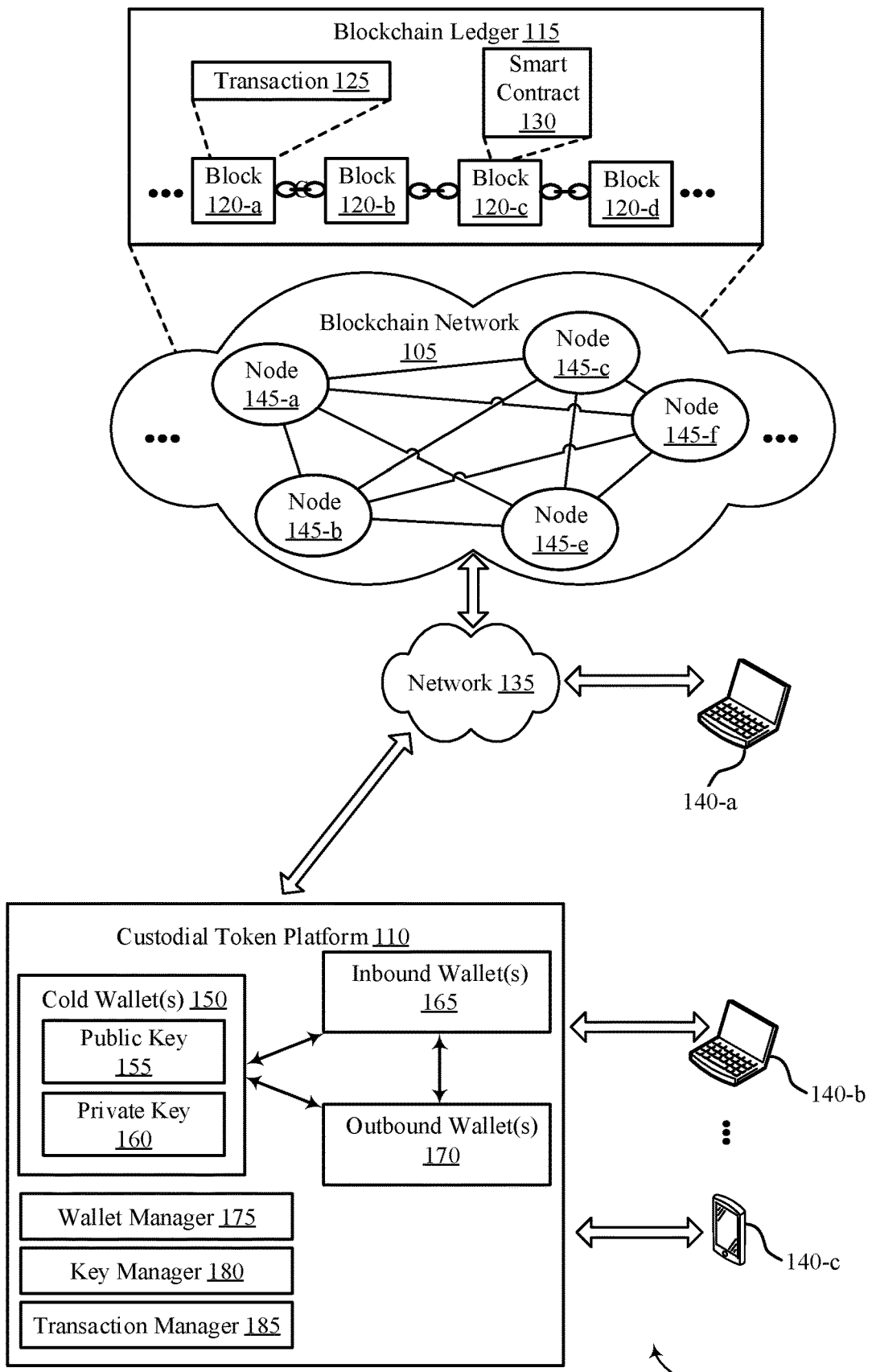
FIG. 1 illustrates an example of a computing environment that supports smart contract for inbound transactions in accordance with aspects of the present disclosure.

A user may access a custodial token platform to purchase, sell, exchange, or trade digital assets, such as cryptocurrencies, crypto tokens, or the like. A custodial token platform may support various types of wallets for deposits, withdrawals, and storage. For example, the custodial token platform may generate inbound wallets associated with inbound addresses for user deposits of crypto tokens to accounts associated with the user. The custodial token platform may also use outbound wallets for supporting withdrawals of crypto tokens and cold storage wallets for security. In some cases, the custodial token platform may support a wallet orchestration procedure that moves the crypto tokens between the various wallets of the custodial token platform for various reasons including liquidity management and security. In some examples, the wallet orchestration may be performed manually by administrators of the custodial token platform or may be performed via a static configuration. However, as cryptocurrency markets are increasingly dynamic, wallet orchestration between various wallets of a custodial token platform is increasingly complex, and may require consideration of current market states, market histories, and current wallet balances.

In some examples, a wallet orchestration procedure may periodically flush crypto tokens from inbound addresses to other addresses associated with the custodial token platform via flush transactions. These transactions may occur on a scheduled basis, in response to one or more threshold balances being satisfied, or the like. In some examples, these flush transactions may result in significant transaction fees (e.g., gas fees) for a blockchain network associated with the crypto token. As hundreds or thousands of these transactions may be performed by the custodial token platform, the transactions and corresponding fees may result in significant processing fee overhead for the custodial token platform.

Techniques described herein address the forgoing by supporting deployment, to a blockchain network, of an inbound smart contract for each user of a set of users of the custodial token platform, and the inbound smart contracts may be used to manage and perform flush transactions from the inbound smart contract to an outbound address managed by the custodial token platform. Thus, instead of using an inbound address for deposit or inbound transactions to the custodial token platform, the user deposits crypto tokens to an inbound smart contract associated with the user. Additionally, a batch smart contract is deployed to the blockchain network, and the batch smart contract may be configured to control transactions associated with the inbound smart contracts. When the custodial token platform is to move crypto tokens to the outbound address, the custodial token platform may broadcast a transaction that calls the batch smart contract, and the transaction may cause transfer of crypto tokens from the inbound smart contracts to the outbound address. The transfer of the crypto tokens from the multiple inbound smart contracts to the outbound address may occur via a single transaction on the blockchain ledger. As such, this technique may result in fewer transactions, and as a result, less resource overhead and transaction fee overhead for the custodial token platform.

In some examples, the inbound smart contract is deployed for each user of a set of users of the custodial token platform, and the set of users may be determined or identified based on the level of activity for the user. For example, the inbound smart contract may be deployed for users with relatively high levels of activity on the custodial token platform, such as users with many inbound transactions over a given time period. Users that have lower activity levels may continue to utilize an inbound address for inbound transactions/deposits to the custodial token platform. Further, the inbound smart contract may be deployed using a clone and/or proxy deployment technique. This technique may allow the inbound smart contract to be efficiently updated, while reducing transaction fees associated with smart contract deployment.

Aspects of the disclosure are initially described in the context of an environment supporting a custodial token platform. Aspects of the disclosure are further described with respect to a custodial token platform, transaction diagrams, smart contract deployment diagrams, and a process flow diagram. Aspects of the disclosure are further illustrated by and described with reference to apparatus diagrams, system diagrams, and flowcharts that relate to token platform wallet orchestration.

FIG. 1 illustrates an example of a computing environment 100 that supports smart contract for inbound transactions in accordance with various aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145-c may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device.

A computing device 140 may be used to input information to or receive information from the computing system custodial token platform 110, the blockchain network 105, or both. For example, a user of the computing device 140-a may provide user inputs via the computing device 145-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, typically using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis. Additionally, the flush transactions may be provided such as to support liquidity of a crypto token and/or withdrawals of a crypto token. For example, if a user attempts to withdraw a crypto token from the user account associated with the custodial token platform 110, and there are not enough funds in the outbound wallet 170 to cover the withdrawal, then the transaction time for the withdrawal may be increased, as funds may be supplied to the outbound wallet 170) from an inbound wallets 165 or the cold wallet 150 via another transaction to support the withdrawal. Depending on the blockchain network 105 associated with token being withdrawn and/or the state of the blockchain network 105, these transactions may involve significant amounts of time. As such, a withdrawal may be delayed, which may result in unsatisfactory user experience.

Additionally, as these flush transaction may be broadcast periodically for a large quantity of inbound wallets 165, the flush transactions may result in significant resource and transaction overhead for the custodial token platform. For example, a highly active user may deposit crypto tokens multiple times in a day or week, which may result in many flush transactions associated with the inbound wallet for the user. Because the custodial token platform 110 implements and manages the flush transactions (typically without the user's knowledge), the custodial token platform 110 may see increased resource overhead (e.g., processor overhead to generate and broadcast transactions) as well as fee overhead associated with the flush transactions for the user.

Techniques described herein support batching flushing transactions for a set of users of the custodial token platform 110 using inbound contracts and a batch smart contract that is configured to control the inbound smart contracts. For example, instead of using the inbound wallet 165 to receive deposit transactions for a user, an inbound smart contract (e.g., smart contract 130) for the user is deployed to the blockchain network 105, and the inbound smart contract (e.g., an address associated with the inbound smart contract) may be used to receive deposit transactions for the user. An inbound smart contract may be deployed for each user of a set of users of the custodial token platform 110, and whether a smart contract is deployed for a user may be based on a particular user's activity level on the custodial token platform 110. The batch smart contract (e.g., the smart contract 130) may also be deployed to the blockchain network 105, and the batch smart contract may be configured to control or manage a set of inbound smart contracts for a set of users. After one or more conditions being satisfied, such as balances of a set of inbound smart contracts reaching a threshold or based on a scheduled flush job, the custodial token platform 110 may broadcast a transaction that calls one or more methods of the batch smart contract. The transaction may cause transfer of tokens of a set of inbound smart contracts managed by the batch smart contract to an outbound wallet (e.g., outbound wallet 170) of the custodial token platform 110. That is, after receipt of the transaction broadcast by the custodial token platform 110, the batch smart contract may broadcast a transaction that calls a transfer function of each of the inbound smart contracts such as to transfer crypto tokens from the inbound smart contracts to the outbound address (e.g., outbound wallets 170) managed by the custodial token platform. The transfer of the crypto tokens from each of the inbound smart contracts associated with the transaction may occur via a single transaction on the blockchain ledger 115 (e.g., as a state transfer for a single transaction). More particularly, if viewing the transaction on a blockchain explorer, the transaction may be accessed via a single transaction identifier, but may include information that indicates a set of state transfers between addresses of the inbound smart contracts and the outbound wallet 170. Because these transfers may occur via a single transaction, transaction costs, fees, and overhead may be reduced for the custodial token platform 110. As the custodial token platform 110 may perform multiple flush procedures over a given time period, these techniques, in aggregate, may result in significant transaction overhead reduction and fee reduction. These and other techniques are described in further detail herein.

It should be appreciated by a person skilled in the art that one or more aspects of the disclosure may be implemented in a computing environment 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
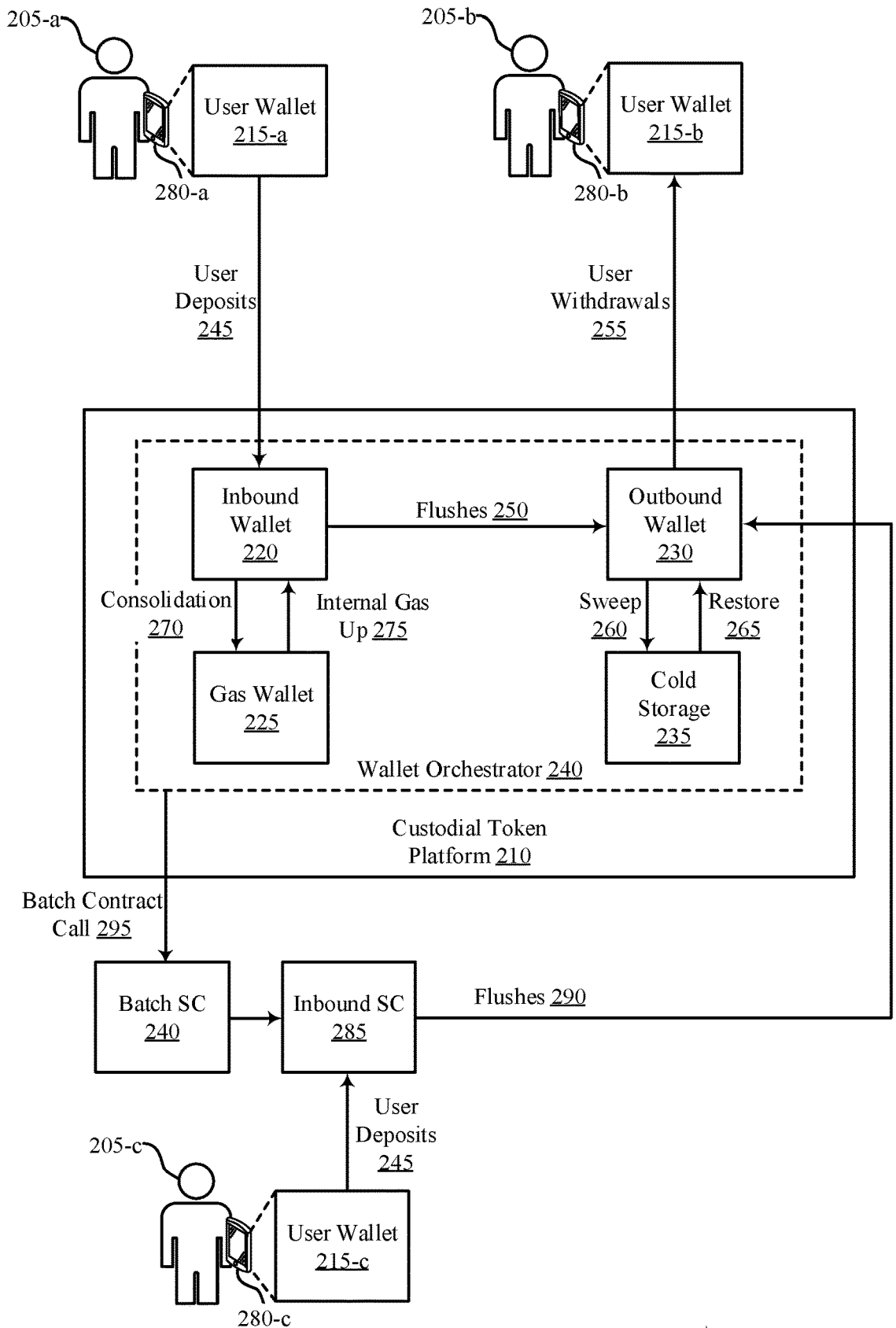
FIG. 2 illustrates an example of a computing environment that supports smart contract for inbound transactions in accordance with aspects of the present disclosure.

FIG. 2 illustrates an example of a computing environment 200 that supports smart contract for inbound transactions in accordance with aspects of the present disclosure. The computing environment 200 includes a custodial token platform 210 and users 205 with respective user device 280. The custodial token platform 210 may be an example of the custodial token platform 110 as described with respect to FIG. 1, and the user devices 280) may be examples of the computing devices 140 as described with respect to FIG. 1.

The custodial token platform 210 may support various wallets for various purposes. For example, the custodial token platform 210 supports inbound wallets 220, gas wallets 225, outbound wallets 170, and cold storage 235 (e.g., cold storage wallets). In some examples, the custodial token platform 210 may create or implement a new inbound wallet 220) per user 205, per user account, or per deposit transaction 245. For example, the user 205-*a* may access a user wallet 215-*a* on the user device 280-*a* to generate and broadcast a deposit transaction 245 to deposit a crypto token to an account associated with the custodial token platform 210. The account may be associated with user 205-*a* or another user. In some examples, for each deposit transaction 245 (e.g., user deposits), the custodial token platform 210 generates a new inbound wallet 220. In other cases, the custodial token platform 210 may maintain an inbound wallet 220 per user account (or per crypto token per user account or per blockchain network used by a user account).

Additionally, as described herein, the custodial token platform 210 may broadcast transactions (e.g., to the blockchain network 105 of FIG. 1) to move crypto tokens between the various wallets of the custodial token platform 110. For example, the custodial token platform 210 may implement periodic flush transactions 250) to move crypto tokens between inbound wallets 220 and the outbound wallets 230. In some examples, the flush transactions 250) are used to support user withdrawal transactions 255. For example, a user 205 may access a user account on the custodial token platform 210 (e.g., via the user device 280-*b*) and withdraw funds (via a withdrawal transaction 255) to the external user wallet 215-*b* or send funds to another external user wallet associated with another user. As such, the custodial token platform 210 may maintain an adequate balance of the outbound wallet 230 to support withdrawals. The custodial token platform 210 may also implement sweep transactions 260 to move crypto tokens from the outbound wallet 230 to the cold storage 235 and restore transactions 265 to move crypto tokens from the cold storage 235 to the outbound wallet 230.

In some cases, a job is executed periodically to perform the flush transactions 250. The job may select a set of inbound addresses with the highest balances (e.g., top ten inbound addresses with the highest balances). The job may flush the balances in an order determined by the balance and prioritize outbound wallets 230 to target the flushes (e.g., receive the crypto tokens). In some examples, the job may consider the balance and the gas fee to determine whether to flush an inbound wallet 220. For example, if the balance is greater than three times the gas fee (e.g., network fee), then the job may flush the balance. In some cases, the custodial token platform 210 may use the gas wallet 225 to consolidate crypto tokens (e.g., via a consolidation transaction 270) and to leverage for providing assets (e.g., crypto tokens) to cover transaction fees (e.g., via internal gas up transactions 275). For example, after determining to flush one of the inbound wallets 220, the custodial token platform may provide tokens to the inbound wallet 220 via the internal gas up transaction 275 and flush the inbound wallet 220 via the flush transaction 250. Any tokens remaining in the inbound wallet 220 after the flush may be provided to the gas wallet 225 via a consolidation transaction 270. In some examples, these various transactions may result in large amount of network fees (e.g., fees for the blockchain network 105 of FIG. 1). Further, the job may flush an inbound wallet 220, and the flush transaction 250 may move an amount of crypto token that is less than the actual network fees. Additionally, this technique effectively flushes crypto tokens from inbound to outbound almost immediately after a deposit transaction.

Techniques described herein support efficient wallet orchestration by aggregating multiple individual wallet transactions into a single wallet transaction associated with a single flush transaction (e.g., rather than individual flush transactions 250 for each of the wallet transactions). In particular, inbound smart contracts 285 may be used to manage and perform the flush transactions 250 from an inbound smart contract 285 to an outbound address managed by the custodial token platform 210. Thus, instead of using an inbound address for deposit into an inbound wallet 220 or inbound transactions to the custodial token platform 210, the user may deposit crypto tokens into an inbound smart contract 285 associated with the user. Often, depositing into the inbound smart contract address rather than the inbound address may be unperceivable to the user.

Additionally, a batch smart contract 240 deployed to the blockchain network may control transactions associated with the inbound smart contracts 285. When the custodial token platform 210 is to move crypto tokens to the outbound address, the custodial token platform 210 may broadcast a transaction that calls the batch smart contract 240 (e.g., via batch contract call 295), and the transaction may cause transfer of crypto tokens from the inbound smart contracts 285 to the outbound address for the outbound wallet 230 as flush transactions 290. The transfer of the crypto tokens from the multiple inbound smart contracts 285 to the outbound address may occur via a single transaction on the blockchain ledger. As such, this technique may result in fewer transactions, and as a result, reduced resource overhead and transaction fee overhead for the custodial token platform 210.

Figure 3:
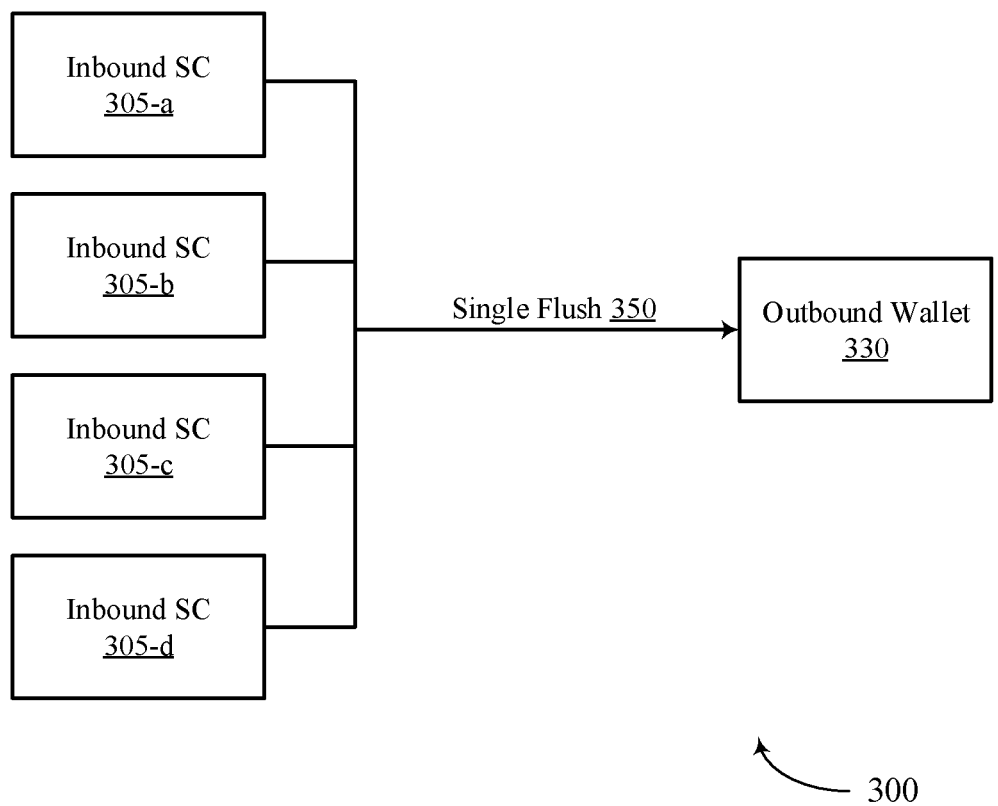
FIG. 3 illustrates an example of a single flush transaction that supports smart contract for inbound transactions in accordance with aspects of the present disclosure.

FIG. 3 illustrates an example of a single flush transaction 300 that supports smart contract for inbound transactions in accordance with aspects of the present disclosure. The single flush transaction 300 may be an example of or operate similarly to the flush transactions 290 and may be implemented by inbound smart contracts 305 and received by an outbound wallet 330. The inbound smart contracts 305 may be an example of or operate similarly to the inbound smart contract 285, and the outbound wallet 330 may be an example of or operate similarly to the outbound wallet 230, as described with respect to FIG. 2.

As previously mentioned, the custodial token platform 210 may support various wallets for various purposes, such as inbound wallets. To reduce the number of flush transactions, the custodial token platform 210 may use inbound smart contracts 305 instead of inbound wallets or inbound addresses for the inbound wallets. For example, users may deposit crypto tokens into a respective first inbound smart contract 305-a, a second inbound smart contract 305-b, a third inbound smart contract 305-c, and a fourth inbound smart contract 305-d, rather than respective inbound addresses (e.g., inbound addresses are replaced with smart contracts). As will be discussed with respect to FIG. 4, the custodial token platform 210 may batch the inbound smart contracts 305 based on one or more factors.

The crypto tokens of batched inbound smart contracts 305 may be transmitted to the outbound wallet 330 in a single flush transaction 350. That is, multiple token transfers from the inbound smart contracts 305 to the outbound wallet 330 may occur in a single transaction using smart contracts. Thus, the single flush transaction 350 may include a set of state transfers that transfer the respective crypto tokens from the inbound smart contracts 305-b to the outbound wallet 330. The single transaction 350 may be associated with a single transaction identifier and a set of state transfers. Thus, when viewing the single flush transaction 350 via a blockchain explorer, the transaction may be viewed via the transaction identifier, and the transaction may include information indicating a set of state transfers between the addresses associated with the inbound smart contracts 305 and the outbound wallet 330. As such, the transaction fees associated with the single flush transaction 350 may include fees for a single transaction rather than multiple fees for each of the multiple flush transactions that may otherwise occur when transacting individual inbound addresses. Thus, using smart contracts instead of inbound addresses may facilitate reducing transaction fees with respect to fees associated with transactions for each of the inbound addresses.

Figure 4:
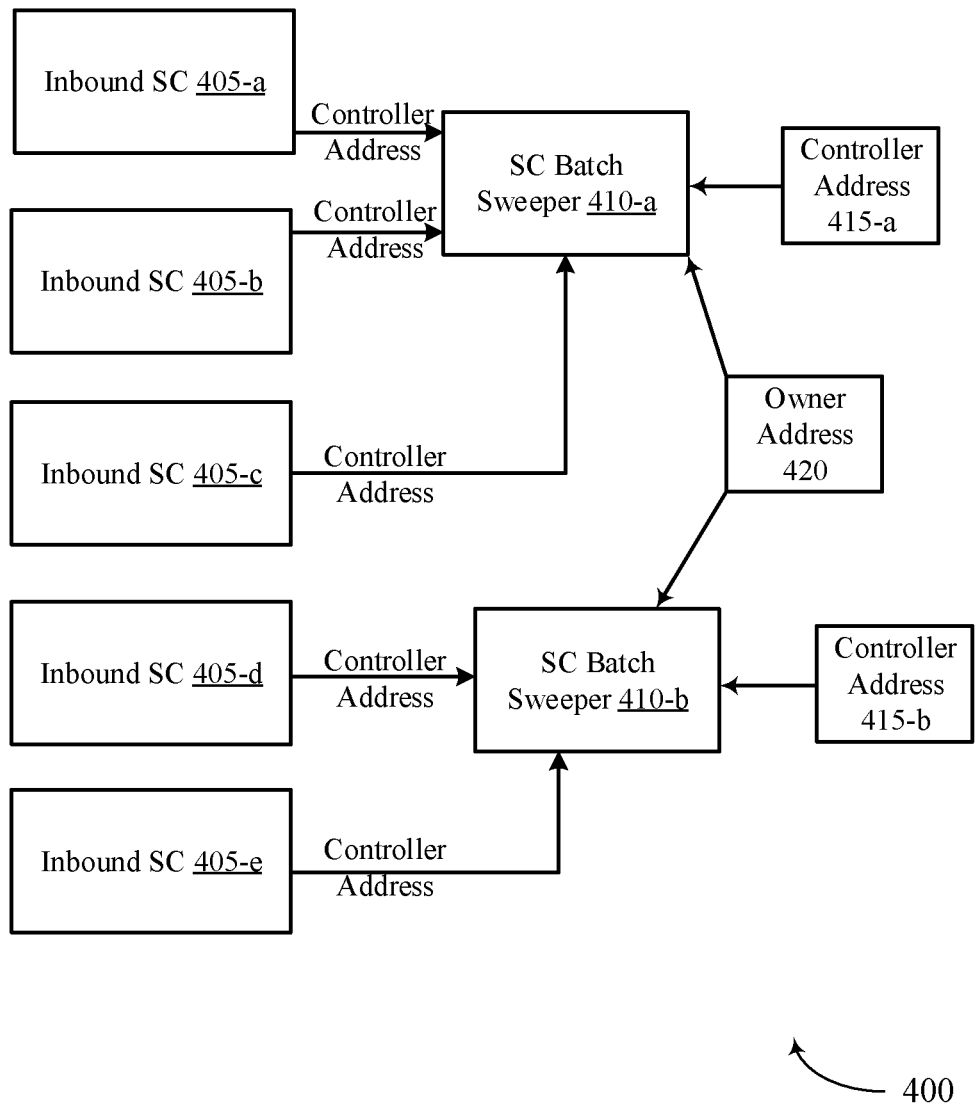
FIG. 4 illustrates an example of a contract diagram that supports smart contract for inbound transactions in accordance with aspects of the present disclosure.

FIG. 4 illustrates an example of a contract diagram 400 that supports smart contract for inbound transactions in accordance with aspects of the present disclosure. The contract diagram 400 includes inbound smart contracts 405, which may be examples of or operate similarly to the inbound smart contracts 285, as described with respect to FIG. 2. The contract diagram 400 may facilitate performing the single flush transaction 350, as described with respect to FIG. 3. Each of the inbound smart contracts 405 may be associated with a respective smart contract address, as described herein.

In particular, smart contract batch sweepers 410 (which may be examples of the batch smart contract, as described herein) may call and invoke flush transactions on multiple inbound smart contracts 405 to transfer their respective crypto tokens in a single transaction. As shown, the inbound smart contracts 405, such as a first inbound smart contract 405-a, a second inbound smart contract 405-b, a third inbound smart contract 405-c may be controlled by a first smart contract batch sweeper 410-a, and a fourth inbound smart contract 405-d and a fifth inbound smart contract 405-e may be controlled by a second smart contract batch sweeper 410-b.

As described herein, the custodial token platform may determine to deploy an inbound smart contract 405 for a user or account based on various factors. By way of example, the inbound smart contract 405 may be deployed based on the quantity transactions (e.g., deposit transactions to the custodial token platform) above a threshold quantity of transactions (e.g., 10 transactions within 24 hours, 100 transactions with 24 hours, and so forth). Additionally, a new smart contract batch sweeper 410 may be deployed per a quantity of inbound smart contracts deployed. For example, every 1000 inbound smart contracts 405 may be controlled by a respective smart contract batch sweeper 410. As such, in some implementations, a single smart contract batch sweeper 410 may not control every inbound smart contract 405 associated with the custodial token platform. This technique may reduce risk, in cases where a smart contract controller/owner key is compromised or a particular smart contract is otherwise compromised.

Various access control techniques may be implemented to control the smart contracts. For example, each of the inbound smart contracts 405 may hardcode a controller address that associates the inbound smart contracts 405 to a particular smart contract batch sweeper 410. For example, the first inbound smart contract 405-a, the second inbound smart contract 405-b, and the third inbound smart contract 405-c may each have a hardcoded controller address associated with the first smart contract batch sweeper 410-a. Hardcoding a controller address for the inbound smart contract 405 to the respective smart contract batch sweeper 410 may facilitate saving costs otherwise associated with gas fees (e.g., network fees) for using a controller address that is a dynamic variable in the inbound smart contracts 405.

Further, each smart contract batch sweeper 410 may be associated with an owner address 420 and a controller address 415. A user or entity with access to the owner address 420 (and the corresponding private key) may be able to assign access or control of the smart contract batch sweeper 410 to another address, such as the controller address 415, via a call to the smart contract. Thus, the controller address 415 may be used to broadcast transactions to call the respective smart contract batch sweeper 410 to cause the flush transaction from the corresponding inbound smart contracts 405, as described herein. As such, each controller address 415 may be associated with a flush job, where the flush job uses the controller address 415 to call the corresponding batch sweeper 410 to cause the flush transaction. As described herein, the flush job may monitor balances of various inbound smart contracts 405 and/or outbound wallets to determine when to broadcast the transaction that causes the flush.

Figure 5:
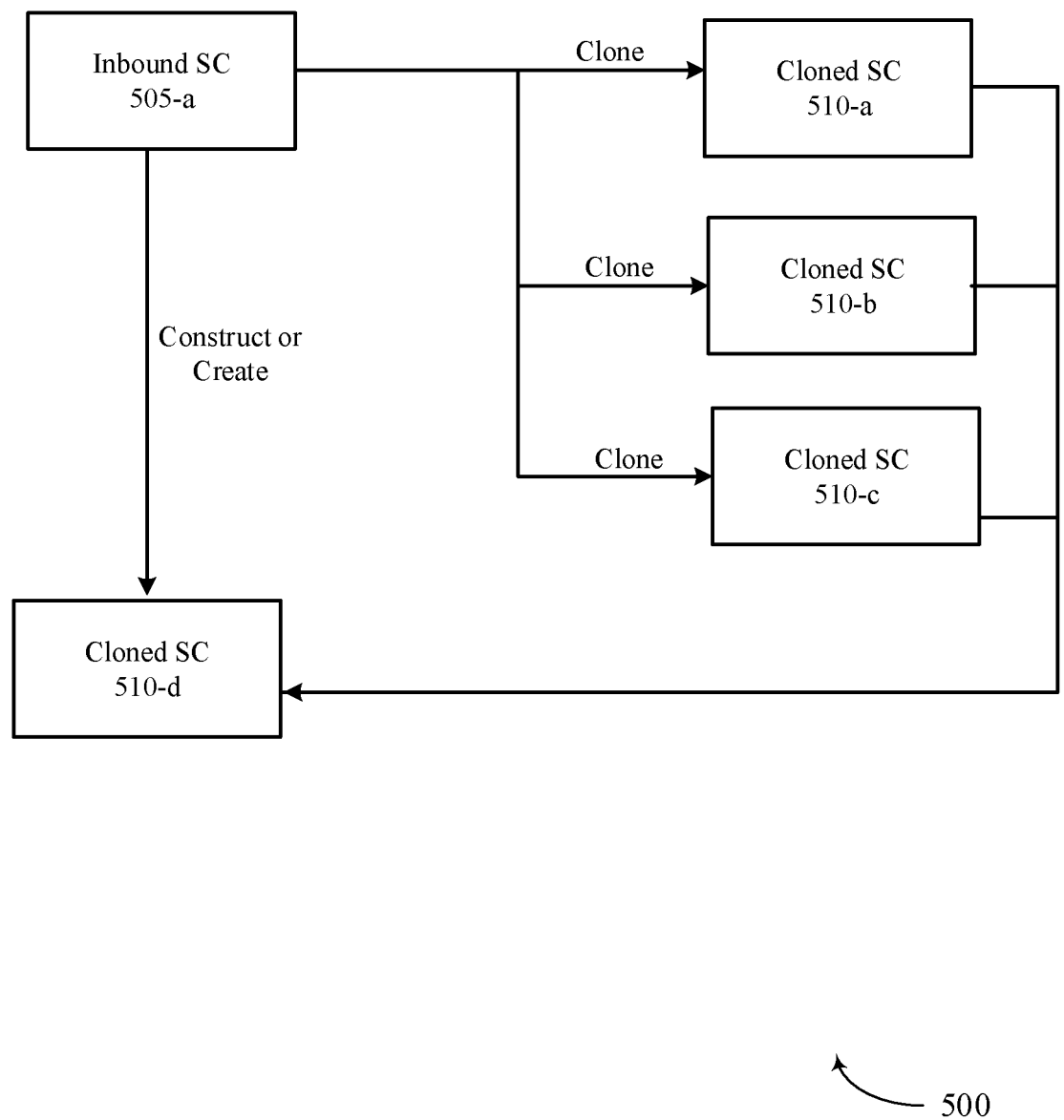
FIG. 5 illustrates an example of a smart contract deployment that supports smart contract for inbound transactions in accordance with aspects of the present disclosure.

FIG. 5 illustrates an example smart contract deployment 500 that supports smart contract for inbound transactions in accordance with aspects of the present disclosure. The smart contract deployment includes an inbound smart contract 505, which may be an example of or operate similarly to the inbound smart contract 285, as described with respect to FIG. 2. In some examples, to conserve fees and resource overhead, the custodial token platform (e.g., custodial token platform 110 of FIG. 1) may use a smart contract cloning technique to deploy the inbound smart contracts. Further, this technique may support efficient upgrading or modifying of inbound smart contracts. For example, the smart contracts may be modified to add new or more functionality or to otherwise update an existing implementation. To support the modification, the inbound smart contract 505 may be cloned (e.g., replicated) without additional details, reducing resources and fees otherwise associated with generating additional smart contracts manually or semi-manually (e.g., creating new smart contracts using details).

For deploying an inbound smart contract for a user to deposit crypto tokens, the inbound smart contract may be cloned to generate a cloned smart contract 510. For example, a first inbound smart contract 505-a may be cloned to generate a first cloned smart contract 510-a, a second cloned smart contract 510-b, and a third cloned smart contract 510-c, and each cloned smart contract 510 may correspond to a respective user or account for deposits. The cloned smart contract 510 may be a clone of a logic instance of the inbound smart contract 505 and correlate to (e.g., is the same as) the inbound smart contracts 505, such that parameters of the cloned smart contracts 510 are generally the same as the inbound smart contract 505. In this manner, the output of the cloned smart contract 510 may correlate to an output of the inbound smart contract 505. The logic instance of each inbound smart contract 505 and/or the cloned smart contract 510 may delegate a call to the same logic instance.

In some examples, a cloned smart contract 510 may be used for additional cloning, for example, to generate another cloned smart contract 510. For example, one or more of the first cloned smart contract 510-a, the second cloned smart contract 510-b, and the third cloned smart contract 510-c may be cloned to generate a fourth cloned smart contract 510-d. In additional or alternative examples, the initial inbound smart contract 505 may be used to reconstruct or create a cloned smart contract 510. For example, parameters of the first inbound smart contract 505-a may be used to construct the fourth cloned smart contract 510-d.

In some examples, a logic instance of an inbound smart contract 505 may be updated in a manner that facilitates updating parameters of an inbound smart contract 505 while the original controller address is maintained (e.g., stays the same). Generally, the updating implementation may deploy new bytecode via the same controller address. The implementation may also deploy code to remove features of the inbound smart contract 505 that existed before the update. In some examples, after cloning or updating, the initial inbound smart contract 505 may be automatically removed (e.g., without additional user input).

Figure 6:
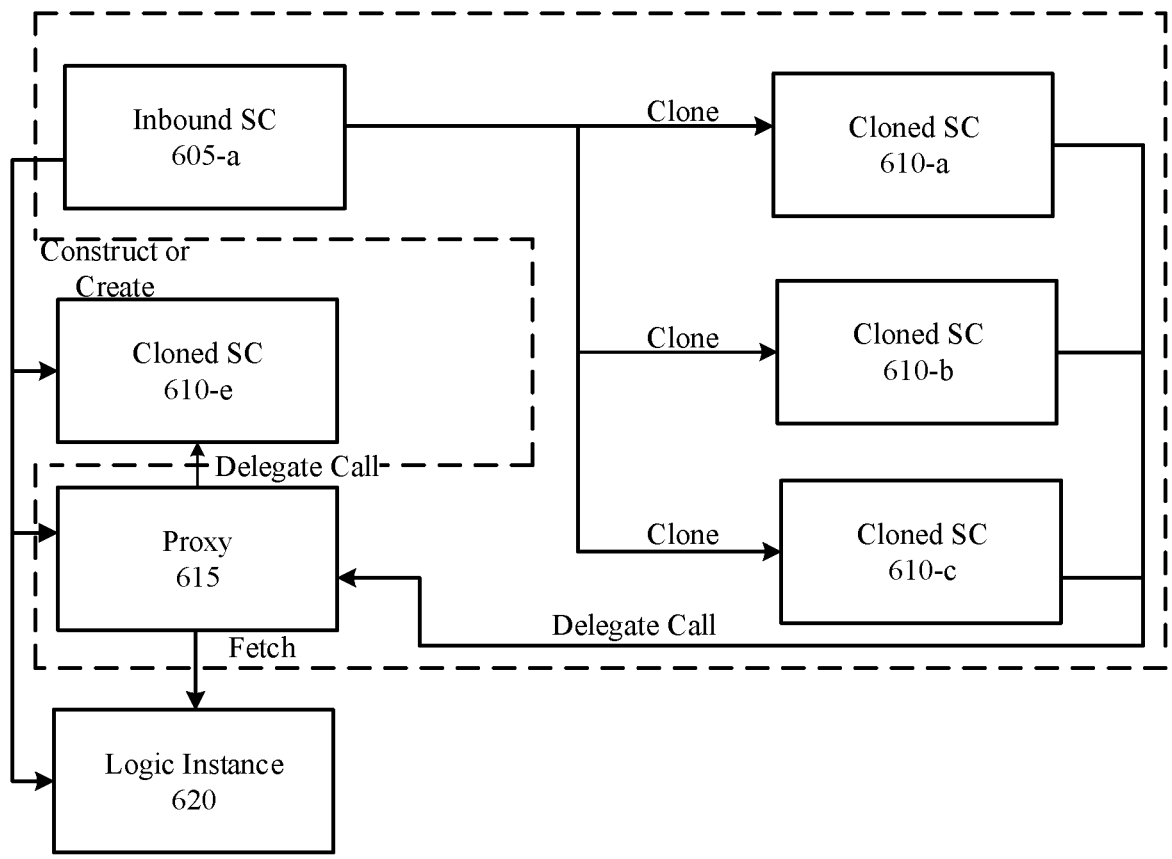
FIG. 6 illustrates another example of a smart contract deployment that supports smart contract for inbound transactions in accordance with aspects of the present disclosure.

FIG. 6 illustrates another example of a smart contract deployment 600 that supports smart contract for inbound transactions in accordance with aspects of the present disclosure. The smart contract deployment 600 includes an inbound smart contract 605, which may be an example of or operate similarly to the inbound smart contract 285, as described with respect to FIG. 2. In some examples, and as depicted, a proxy 615 may be implemented between the inbound smart contract 605 and an associated logic instance 620. The cloning operations, as shown by the dashed line box, may operate and occur as described with respect to FIG. 5. That is, the first inbound smart contract 605-a may be cloned to generate a first cloned smart contract 610-a, a second cloned smart contract 610-b, and a third cloned smart contract 610-c, and one or more of these cloned smart contracts 605 may generate a fourth cloned smart contract.

In some examples, each of the cloned smart contracts 610, including a fifth cloned smart contract 610-e, may be clones of the inbound smart contract 605 or clones of the associated logic instance 620. Each cloned smart contract 610 may be deployed for a user of the custodial token platform to support inbound flushes, as described herein. To illustrate, an inbound smart contract 605 may delegate call a proxy 615 (e.g., in response to receiving a call from a batch smart contract), which may cause a delegate call to the logic instance 620 associated with the inbound smart contract 605. Generally, after cloning, the cloned smart contract 610 may call the proxy 615 to fetch the inbound address from the inbound smart contract 605.

Additionally or alternatively to using the smart contract batch sweeper (e.g., the smart contract batch sweeper 410 of FIG. 4), the delegate call to the proxy 615 may be used to fetch an inbound smart contract address. Moreover, since the delegate call may use the proxy 615 to fetch an inbound address, the proxy implementation may not utilize hardcoding, which is otherwise used in the smart contract batch sweeper 410. As such, the proxy 615 may not store the address of a logic instance since it may execute the delegate call from the inbound smart contract 605. In some examples, the address of the logic instance may be stored in a separate contract, which may be fetched by the proxy 615. Additionally, or alternatively, the address of the logic instance may be stored on each of the inbound smart contracts 605.

By using the proxy 615, for example, for upgrading multiple smart contracts (e.g., cloned smart contracts 610) a contract address storage may be updated to point to a new address. In particular, the cloned smart contracts 610 may call the proxy 615, which may call the new inbound address, and thus, the cloned smart contracts 610 may each be updated with the new inbound address that is stored for the upgrade (e.g., a new inbound address for the new contract that is updated).

Thus, as described herein, a batch smart contract may, in response to receiving or identifying a transaction that calls the batch smart contract, call the cloned smart contracts 610 such as to transfer the set of one or more crypto tokens from each cloned smart contract to an outbound address, as described herein. Further, as describe herein, because of the use of clones and the proxy pattern for smart contract deployment, smart contracts may be efficiently upgraded or modified.

Figure 7:
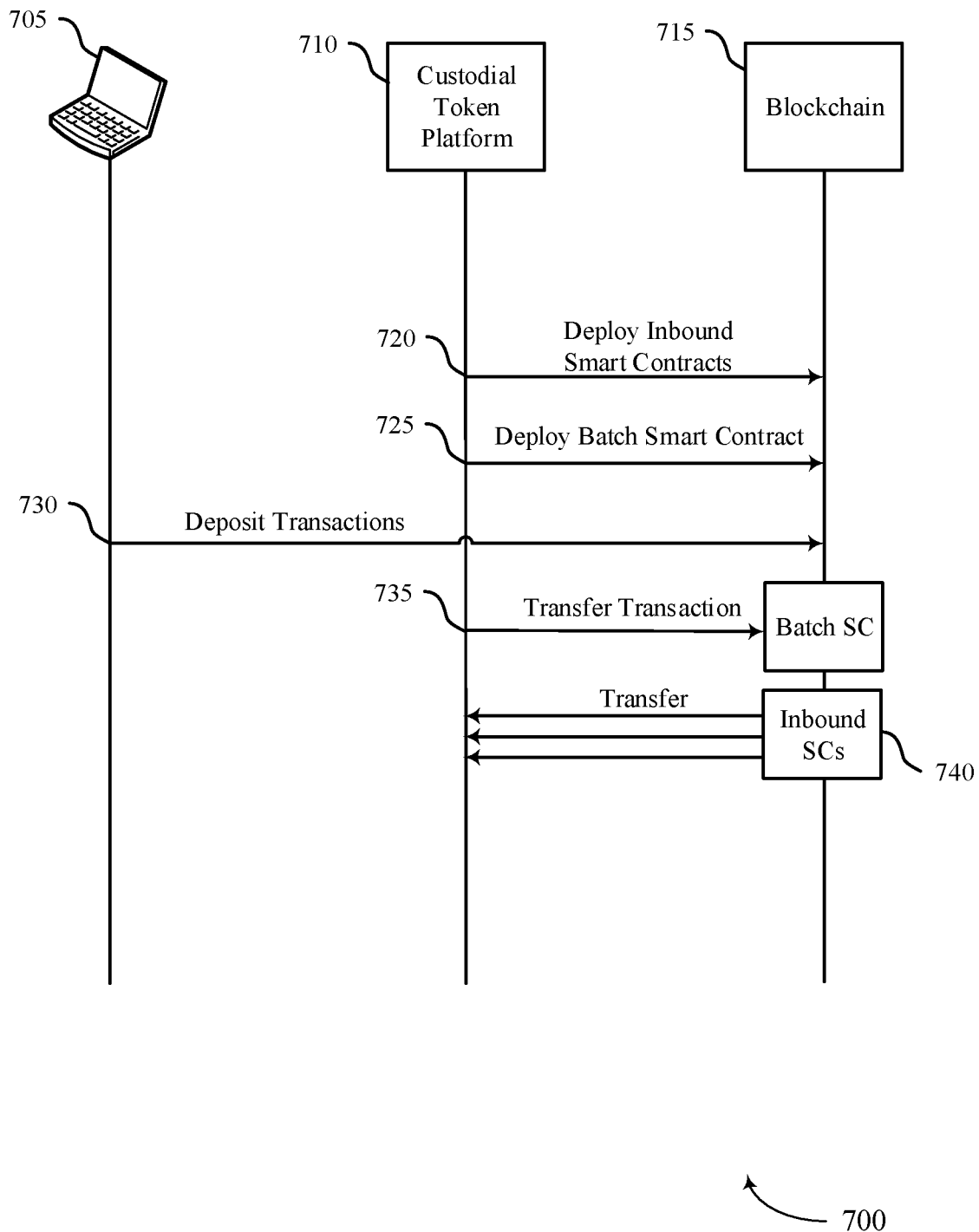
FIG. 7 illustrates an example of a process flow that supports smart contract for inbound transactions in accordance with aspects of the present disclosure.

FIG. 7 illustrates an example of a process flow 700 that supports token platform wallet orchestration in accordance with aspects of the present disclosure. The process flow 700 includes a user device 705, a custodial token platform 710, and a blockchain 715, which may be examples of the corresponding devices or systems as described herein with respect to FIGS. 1 through 3. In the following description of the process flow 700, the operations between the user device 705, the custodial token platform 710, and the blockchain 715 may be transmitted in a different order than the example order shown, or the operations performed may be performed in different orders or at different times. Some operations may also be omitted from the process flow 700, and other operations may be added to the process flow 700.

The custodial token platform 710 may determine a plurality of users for deploying an inbound smart contract for receiving deposit transactions for the users. For example, the custodial token platform 710 may identify users that have high activity level (e.g., deposit transactions above a configured threshold) associated with the custodial token platform 710. In some examples, the activity level is considered with respect to the type of crypto token, such as high activity level with respect to a particular blockchain. As such, if a user has high activity level but the activity is spread across multiple blockchains, then the user may not be selected for inbound smart contract deployment. On the other hand, if the user has a relatively high activity level on a particular blockchain, then the user may be selected for use of an inbound smart contract for receiving deposit transactions, as described herein.

At 720, the custodial token platform 710 may deploy, to a blockchain ledger (e.g., the blockchain 715), a plurality of inbound smart contracts including a first inbound smart contract for a first user of a plurality of users of a custodial token platform. A first address of the first inbound smart contract is configured to receive a first set of one or more crypto tokens, and the first address corresponds to a user account of the first user on the custodial token platform. Deploying the plurality of inbound smart contracts may also include deploying a second inbound smart contract for a second user of the plurality of users of the custodial token platform. A second address of the second inbound smart contract is configured to receive a second set of one or more crypto tokens, and the second address corresponds to a user account of the second user on the custodial token platform. In some examples, deploying the plurality of smart contracts may include deploying a respective inbound smart contract for each user of a plurality of users. Further, deploying the smart contract may include deploying a respective clone of the inbound smart contract for each user of the plurality of users. The clone may be associated with a proxy instance of the inbound smart contract. In some examples, the deployed inbound smart contract may include a hard-coded version of a smart contract associated with a batch smart contract that is configured to manage transactions associated with the inbound smart contracts.

At 725, the custodial token platform 710 may deploy to the blockchain ledger (e.g., the blockchain 715), a batch smart contract configured to control the plurality of inbound smart contracts.

At 730, user device 705 may broadcast one or more deposit transactions to the blockchain network (e.g., the blockchain 715) for depositing crypto tokens to the custodial token platform 710, and the deposit transactions may be configured to transfer one or more crypto tokens to the inbound smart contract deployed for a user.

At 735, the custodial token platform 710 may broadcast, to the blockchain ledger, a transaction that calls the batch smart contract. The transaction may cause a transfer of the first set of one or more crypto tokens of the first inbound smart contract and the second set of one or more crypto tokens of the second inbound smart contract to an outbound address of the custodial token platform. The transaction may be broadcast based on a scheduled flush and/or based on one or more balance conditions being satisfied (e.g., the balance of the inbound smart contracts is greater than a threshold and/or the balance of the outbound address is less than a threshold).

At 740, a transaction may be broadcast that transfers the crypto tokens from the inbound smart contracts to the outbound address. This transaction may be broadcast by the batch smart contract in response to or after the transaction that calls the batch smart contract. As described herein, the batch smart contract may control a set of inbound smart contracts. The batch smart contract may call the transfer function of each of the set of inbound smart contracts, or may call the transfer function for a subset of the controlled inbound smart contracts, which results in the transfer of the crypto tokens. The transfer of the first set of one or more crypto tokens of the first inbound smart contract and the second set of one or more crypto tokens of the second inbound smart contract to the outbound address may occur in a single transaction on the blockchain ledger of the blockchain 715.

Figure 8:
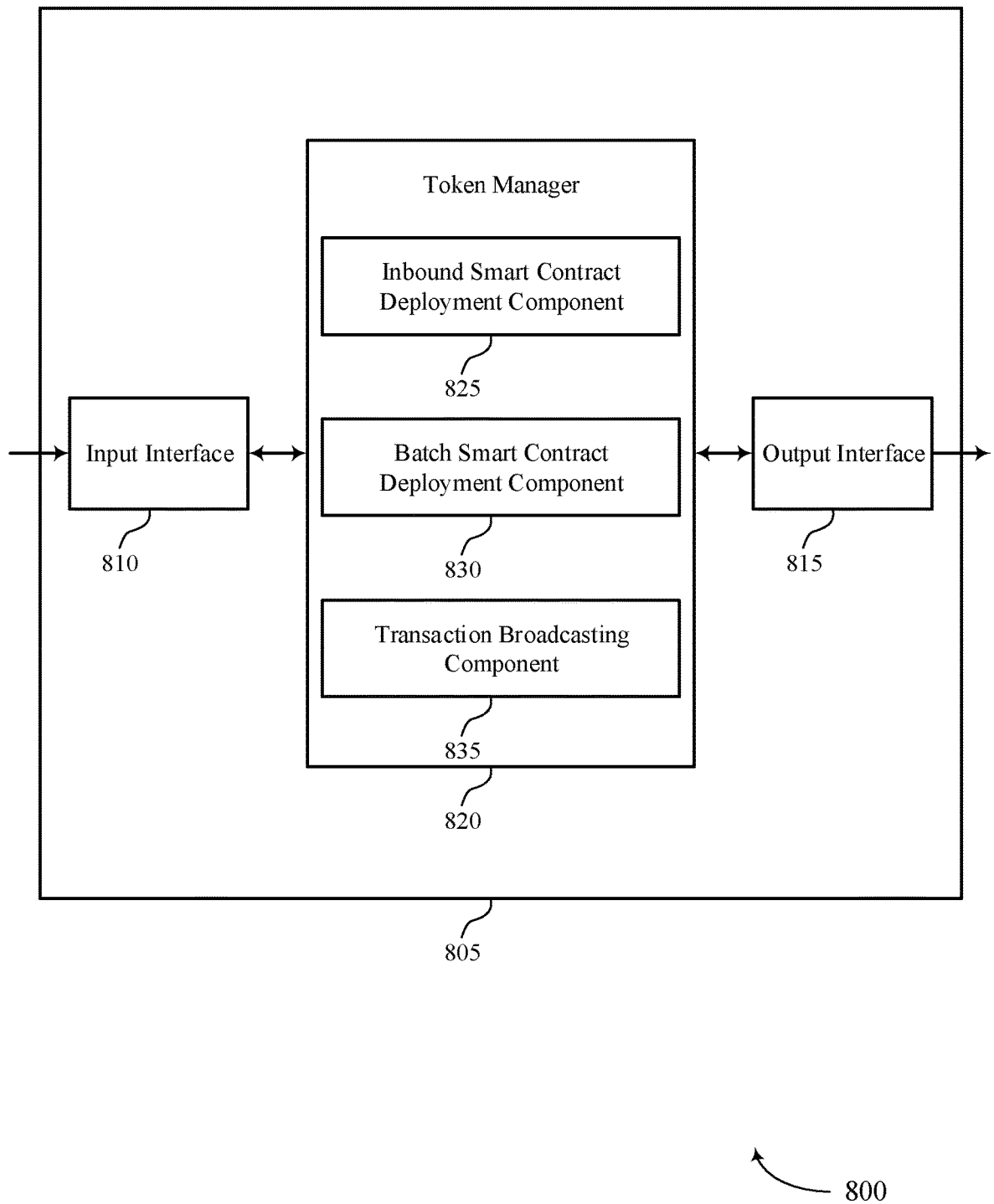
FIG. 8 illustrates a block diagram of an apparatus that supports smart contract for inbound transactions in accordance with aspects of the present disclosure.

FIG. 8 illustrates a block diagram 800 of a system 805 that supports smart contract for inbound transactions in accordance with aspects of the present disclosure. In some examples, the system 805 may be an example of aspects of one or more components described with reference to FIG. 1, such as a custodial token platform 110. The system 805 may include an input interface 810, an output interface 815, and a token manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the token manager 820 to support token platform wallet orchestration. In some cases, the input interface 810 may be a component of a network interface 1015 as described with reference to FIG. 10.

The output interface 815 may manage output signaling for the system 805. For example, the output interface 815 may receive signaling from other components of the system 805, such as the token manager 820, and may transmit such output signaling corresponding to (e.g., representative of or otherwise based on) such signaling to other systems or devices. In some cases, the output interface 815 may be a component of a network interface 1015 as described with reference to FIG. 10.

The token manager 820 may include an inbound smart contract deployment component 825, a batch smart contract deployment component 830, a transaction broadcasting component 835, or any combination thereof. In some examples, the token manager 820, or various components thereof, may be configured to perform various operations (e.g., receiving, monitoring, transmitting) using or otherwise in cooperation with the input interface 810, the output interface 815, or both. For example, the token manager 820 may receive information from the input interface 810, send information to the output interface 815, or be integrated in combination with the input interface 810, the output interface 815, or both to receive information, transmit information, or perform various other operations as described herein.

The token manager 820 may support digital token management in accordance with examples as disclosed herein. The inbound smart contract deployment component 825 may be configured as or otherwise support a means for deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The batch smart contract deployment component 830 may be configured as or otherwise support a means for deploying, to the blockchain ledger, a batch smart contract configured to control the set of multiple inbound smart contracts. The transaction broadcasting component 835 may be configured as or otherwise support a means for broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform.

Figure 9:
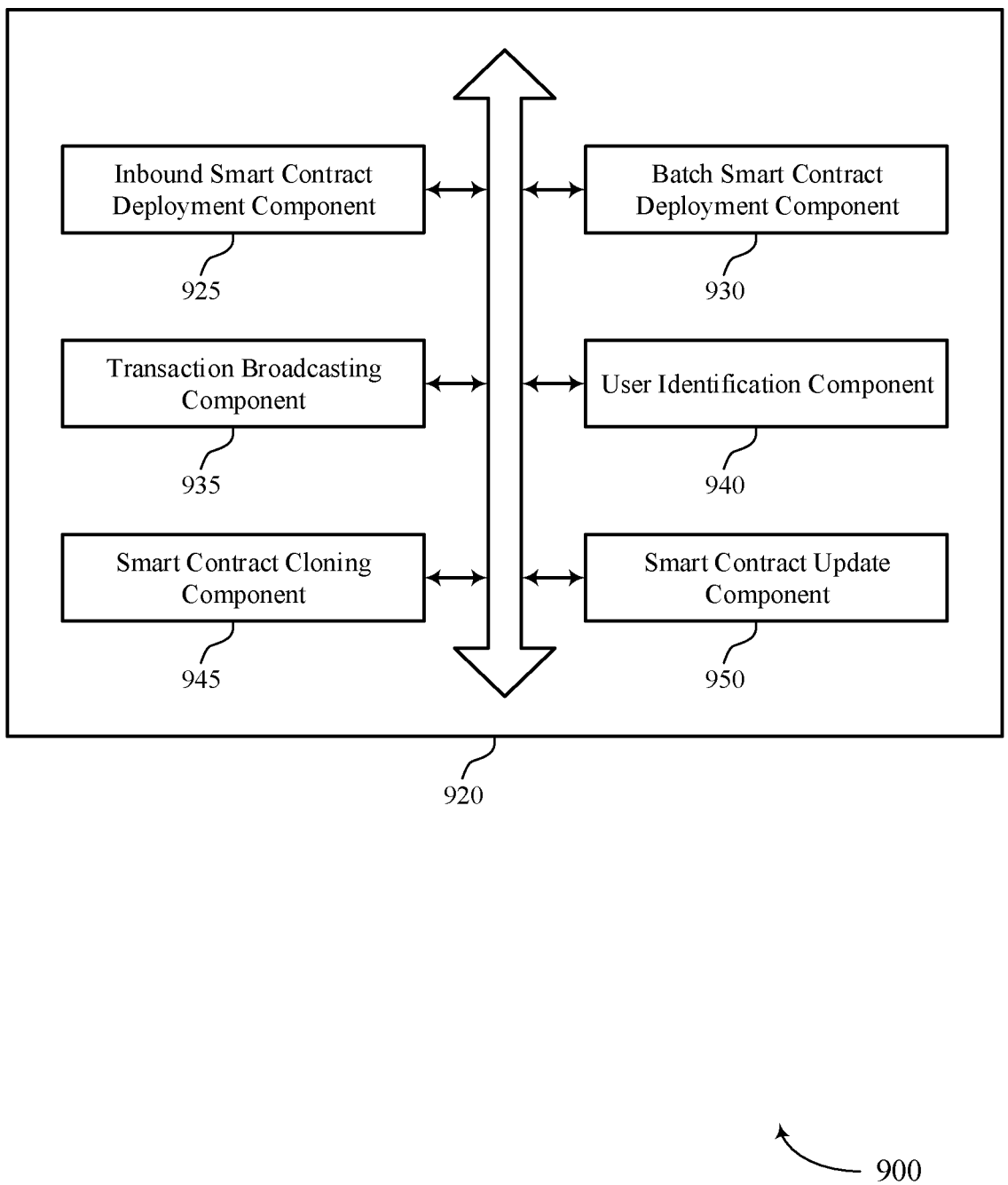
FIG. 9 illustrates a block diagram of a token manager that supports smart contract for inbound transactions in accordance with aspects of the present disclosure.

FIG. 9 illustrates a block diagram 900 of a token manager 920 that supports smart contract for inbound transactions in accordance with aspects of the present disclosure. The token manager 920 may be an example of aspects of a token manager 520, as described herein. The token manager 920, or various components thereof, may be an example of means for performing various aspects of smart contract for inbound transactions as described herein. For example, the token manager 920 may include an inbound smart contract deployment component 925, a batch smart contract deployment component 930, a transaction broadcasting component 935, a user identification component 940, a smart contract cloning component 945, a smart contract update component 950, or any combination thereof. Each of these components may communicate, directly or indirectly, with one another (e.g., via one or more buses, communications links, communications interfaces, or any combination thereof).

The token manager 920 may support digital token management in accordance with examples as disclosed herein. The inbound smart contract deployment component 925 may be configured as or otherwise support a means for deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The batch smart contract deployment component 930 may be configured as or otherwise support a means for deploying, to the blockchain ledger, a batch smart contract configured to control the set of multiple inbound smart contracts. The transaction broadcasting component 935 may be configured as or otherwise support a means for broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform.

In some examples, the transfer of the first set of one or more crypto tokens of the first inbound smart contract and the second set of one or more crypto tokens of the second inbound smart contract to the outbound address occurs in a single transaction on the blockchain ledger.

In some examples, the transaction causes the transfer of a respective set of one or more crypto token from each of the set of multiple inbound smart contracts.

In some examples, to support deploying the set of multiple inbound smart contracts, the inbound smart contract deployment component 925 may be configured as or otherwise support a means for deploying a respective inbound smart contract for each user of the set of multiple users.

In some examples, the user identification component 940 may be configured as or otherwise support a means for determining the set of multiple users for which a respective inbound smart contract is deployed, where the determination is based on a level of activity of a respective user of the set of multiple users on the blockchain ledger.

In some examples, to support deploying the set of multiple inbound smart contracts, the smart contract cloning component 945 may be configured as or otherwise support a means for deploying a respective clone of an inbound smart contract for each user of the set of multiple users, where each respective clone is associated with a proxy instance of the inbound smart contract and where the transaction causes the batch smart contract to call a transfer function of each respective clone to cause the transfer.

In some examples, the smart contract update component 950 may be configured as or otherwise support a means for deploying a new version of the inbound smart contract to the blockchain ledger. In some examples, the smart contract update component 950 may be configured as or otherwise support a means for updating a proxy contract associated with the proxy instance to reference a smart contract address associated with the new version of the inbound smart contract.

In some examples, each of the set of multiple inbound smart contracts includes a hard-coded version of a smart contract address associated with the batch smart contract. In some examples, the transaction causes the transfer based on each of the set of multiple inbound smart contracts including the hard-coded version of the smart contract address.

Figure 10:
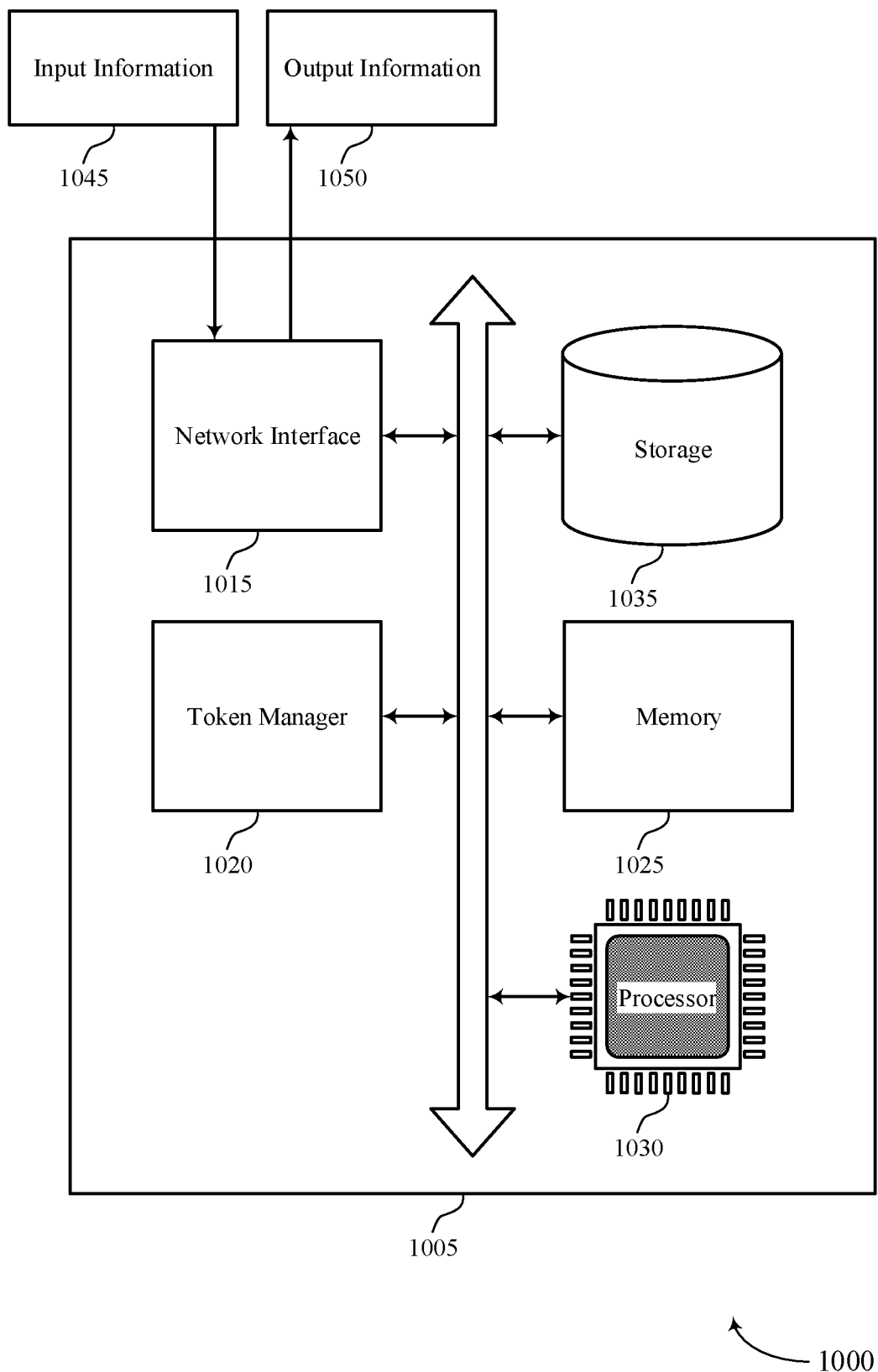
FIG. 10 illustrates a diagram of a system including a device that supports smart contract for inbound transactions in accordance with aspects of the present disclosure.

FIG. 10 illustrates a diagram 1000 of a system 1005 that supports smart contract for inbound transactions in accordance with aspects of the present disclosure. The system 1005 may be an example of or include the components of a system 805 as described herein. The system 1005 may include components for token management, such as a token manager 1020, network interface 1015, a memory 1025, a processor 1030, and a storage 1035. These components may be in electronic communication or otherwise coupled with each other (e.g., operatively, communicatively, functionally, electronically, electrically: via one or more buses, communications links, communications interfaces, or any combination thereof). Additionally, the components of the system 1005 may comprise corresponding physical components or may be implemented as corresponding virtual components (e.g., components of one or more virtual machines). In some examples, the system 1005 may be an example of aspects of one or more components described with reference to FIG. 1, such as a custodial token platform 110.

The network interface 1015 may enable the system 1005 to exchange information (e.g., input information 1045, output information 1050, or both) with other systems or devices (not shown). For example, the network interface 1015 may enable the system 1005 to connect to a network (e.g., a network 135 as described herein). The network interface 1015 may include one or more wireless network interfaces, one or more wired network interfaces, or any combination thereof. In some examples, the network interface 1015 may be an example of may be an example of aspects of one or more components of the custodial asset exchange platform described with reference to FIG. 1.

Memory 1025 may include random access memory (RAM), read only memory (ROM), or both. The memory 1025 may store computer-readable, computer-executable software including instructions that, when executed, cause the processor 1030 to perform various functions described herein. In some cases, the memory 1025 may contain, among other things, a basic input/output system (BIOS), which may control basic hardware or software operation such as the interaction with peripheral components or devices. In some cases, the memory 1025 may be an example of aspects of one or more components of a custodial asset exchange platform described with reference to FIG. 1.

The processor 1030 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 1030 may be configured to execute computer-readable instructions stored in a memory 1025 to perform various functions (e.g., functions or tasks supporting token platform wallet orchestration). Though a single processor 1030 is depicted in the example of FIG. 10, it is to be understood that the system 1005 may include any quantity of one or more of processors 1030 and that a group of processors 1030 may collectively perform one or more functions ascribed herein to a processor, such as the processor 1030. In some cases, the processor 1030 may be an example of aspects of one or more components of a custodial asset exchange platform described with reference to FIG. 1.

Storage 1035 may be configured to store data that is generated, processed, stored, or otherwise used by the system 1005. In some cases, the storage 1035 may include one or more hard disc drives (HDDs), one or more solid state drives (SSDs), or both. In some examples, the storage 1035 may be an example of a single database, a distributed database, multiple distributed databases, a data store, a data lake, or an emergency backup database. In some examples, the storage 1035 may be an example of one or more components of a custodial asset exchange platform described with reference to FIG. 1, For example, the token manager 1020 may be configured as or otherwise support a means for deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The token manager 1020 may be configured as or otherwise support a means for deploying, to the blockchain ledger, a batch smart contract configuring to control the set of multiple inbound smart contracts. The token manager 1020 may be configured as or otherwise support a means for broadcasting, to the blockchain ledger, a transaction that calling the batch smart contract, where the transaction causes a transfer of the first set of one or more crypto tokens of the first inbound smart contract and the second set of one or more crypto tokens of the second inbound smart contract to an outbound address of the custodial token platform.

Figure 11:
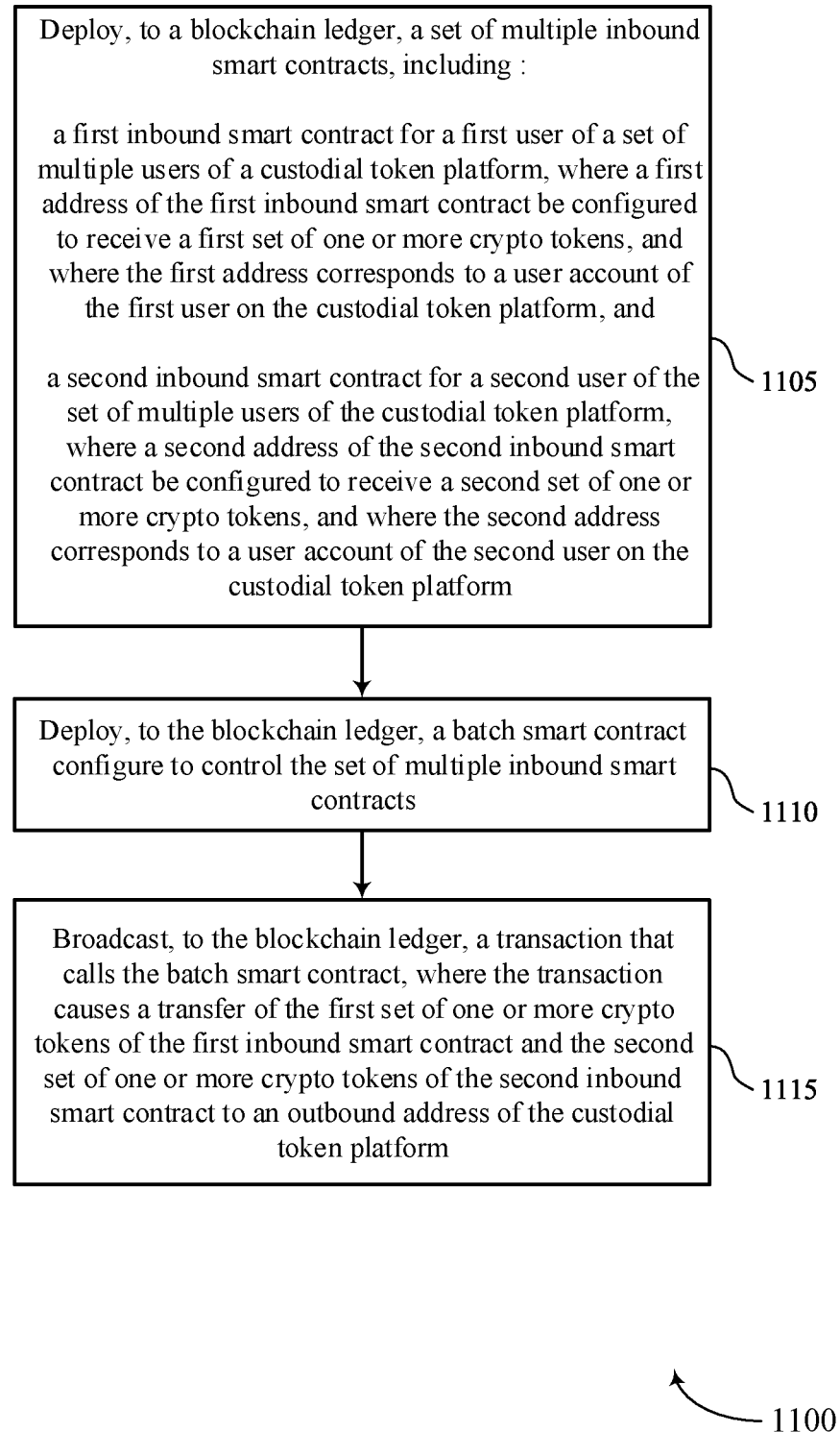
FIGS. 11 through 13 illustrate flowcharts showing methods that support smart contract for inbound transactions in accordance with aspects of the present disclosure.

FIG. 11 illustrates a flowchart showing a method 1100 that supports smart contract for inbound transactions in accordance with aspects of the present disclosure. The operations of the method 1100 may be implemented by a custodial token platform or its components as described herein. For example, the operations of the method 1100 may be performed by a custodial token platform (e.g., a system) as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1105, the method may include deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The operations of 1105 may be performed in accordance with examples as disclosed herein. In some examples, aspects of the operations of 1105 may be performed by an inbound smart contract deployment component 925 as described with reference to FIG. 9.

At 1110, the method may include deploying, to the blockchain ledger, a batch smart contract configured to control the set of multiple inbound smart contracts. The operations of 1110 may be performed in accordance with examples as disclosed herein. In some examples, aspects of the operations of 1110 may be performed by a batch smart contract deployment component 930 as described with reference to FIG. 9.

At 1115, the method may include broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform. The operations of 1115 may be performed in accordance with examples as disclosed herein. In some examples, aspects of the operations of 1115 may be performed by a transaction broadcasting component 935 as described with reference to FIG. 9.

Figure 12:
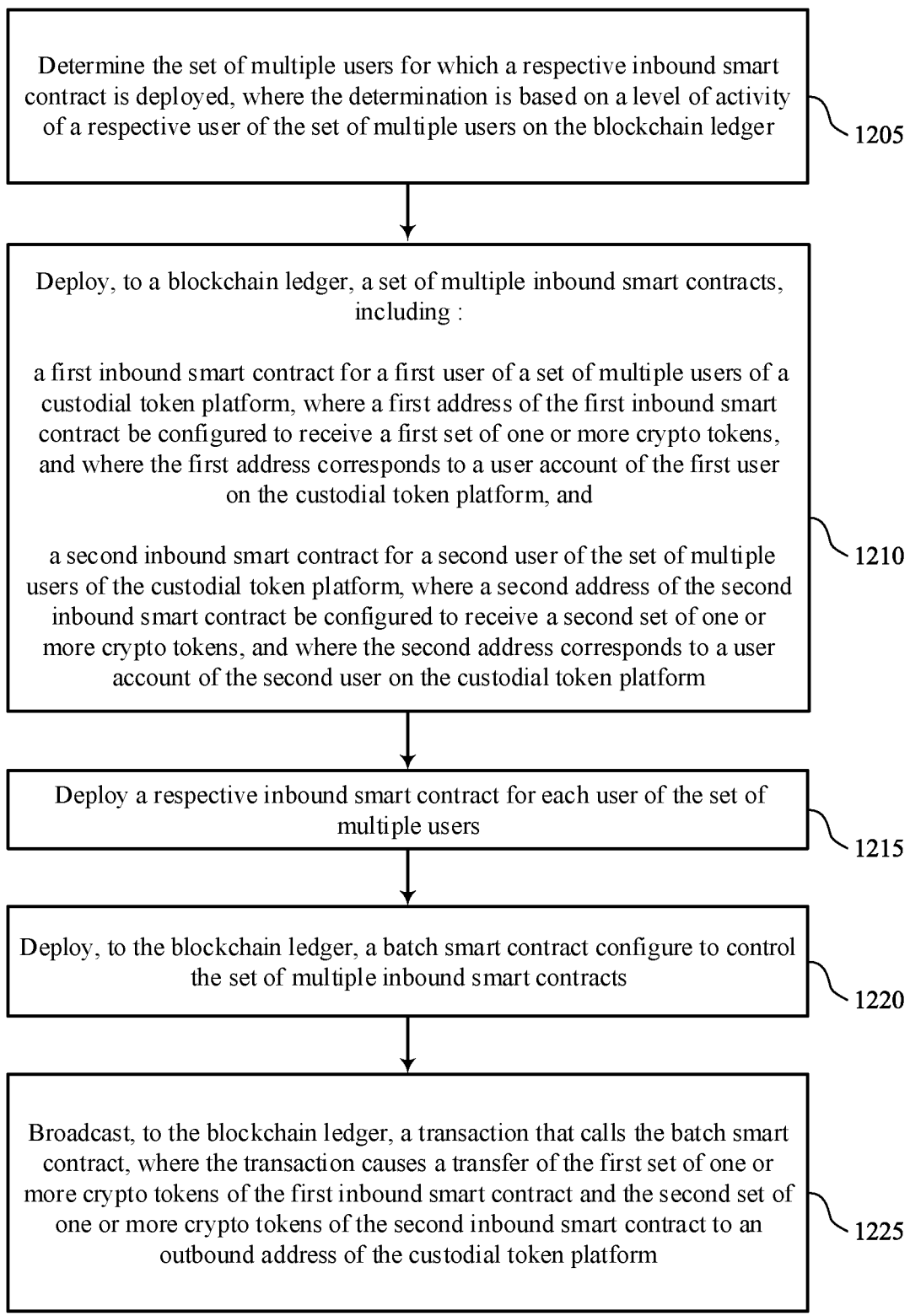

FIG. 12 illustrates a flowchart showing a method 1200 that supports smart contract for inbound transactions in accordance with aspects of the present disclosure. The operations of the method 1200 may be implemented by a custodial token platform or its components as described herein. For example, the operations of the method 1200 may be performed by a custodial token platform (e.g., a system) as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1205, the method may include determining the set of multiple users for which a respective inbound smart contract is deployed, where the determination is based on a level of activity of a respective user of the set of multiple users on the blockchain ledger. The operations of 1205 may be performed in accordance with examples as disclosed herein. In some examples, aspects of the operations of 1205 may be performed by a user identification component 940 as described with reference to FIG. 9.

At 1210, the method may include deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The operations of 1210 may be performed in accordance with examples as disclosed herein. In some examples, aspects of the operations of 1210 may be performed by an inbound smart contract deployment component 925 as described with reference to FIG. 9.

At 1215, the method may include deploying a respective inbound smart contract for each user of the set of multiple users. The operations of 1215 may be performed in accordance with examples as disclosed herein. In some examples, aspects of the operations of 1215 may be performed by an inbound smart contract deployment component 925 as described with reference to FIG. 9.

At 1220, the method may include deploying, to the blockchain ledger, a batch smart contract configured to control the set of multiple inbound smart contracts. The operations of 1220 may be performed in accordance with examples as disclosed herein. In some examples, aspects of the operations of 1220 may be performed by a batch smart contract deployment component 930 as described with reference to FIG. 9.

At 1225, the method may include broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform. The operations of 1225 may be performed in accordance with examples as disclosed herein. In some examples, aspects of the operations of 1225 may be performed by a transaction broadcasting component 935 as described with reference to FIG. 9.

Figure 13:
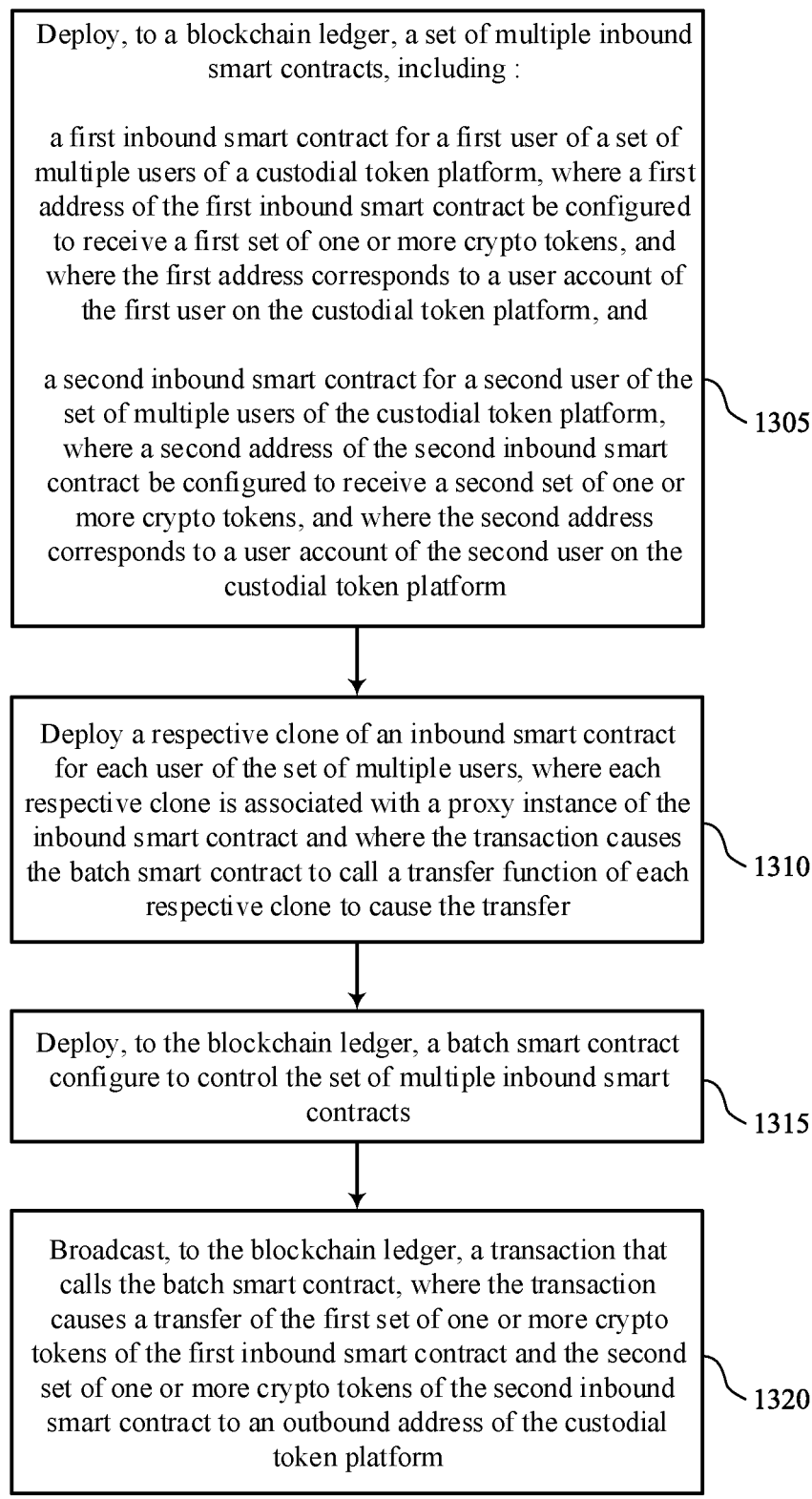

FIG. 13 illustrates a flowchart showing a method 1300 that supports smart contract for inbound transactions in accordance with aspects of the present disclosure. The operations of the method 1300 may be implemented by a custodial token platform or its components as described herein. For example, the operations of the method 1300 may be performed by a custodial token platform (e.g., a system) as described with reference to FIGS. 1 through 7. In some examples, a custodial token platform may execute a set of instructions to control the functional elements of the custodial token platform to perform the described functions. Additionally, or alternatively, the custodial token platform may perform aspects of the described functions using special-purpose hardware.

At 1305, the method may include deploying, to a blockchain ledger, a set of multiple inbound smart contracts, including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform. The operations of 1305 may be performed in accordance with examples as disclosed herein. In some examples, aspects of the operations of 1305 may be performed by an inbound smart contract deployment component 925 as described with reference to FIG. 9.

At 1310, the method may include deploying a respective clone of an inbound smart contract for each user of the set of multiple users, where each respective clone is associated with a proxy instance of the inbound smart contract and where the transaction causes the batch smart contract to call a transfer function of each respective clone to cause the transfer. The operations of 1310 may be performed in accordance with examples as disclosed herein. In some examples, aspects of the operations of 1310 may be performed by a smart contract cloning component 945 as described with reference to FIG. 9.

At 1315, the method may include deploying, to the blockchain ledger, a batch smart contract configured to control the set of multiple inbound smart contracts. The operations of 1315 may be performed in accordance with examples as disclosed herein. In some examples, aspects of the operations of 1315 may be performed by a batch smart contract deployment component 930 as described with reference to FIG. 9.

At 1320, the method may include broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform. The operations of 1320 may be performed in accordance with examples as disclosed herein. In some examples, aspects of the operations of 1320 may be performed by a transaction broadcasting component 935 as described with reference to FIG. 9.

A method is described. The method may include deploying, to a blockchain ledger, a set of multiple inbound smart contracts including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform, deploying, to the blockchain ledger, a batch smart contract configured to control the set of multiple inbound smart contracts, and broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform.

An apparatus is described. The apparatus may include a processor, memory coupled with the processor, and instructions stored in the memory. The instructions may be executable by the processor to cause the apparatus to deploying, to a blockchain ledger, a set of multiple inbound smart contracts including a first inbound smart contract for a first user of a set of multiple users of a custodial token platform, where a first address of the first inbound smart contract be configured to receive a first set of one or more crypto tokens, and where the first address corresponds to a user account of the first user on the custodial token platform and a second inbound smart contract for a second user of the set of multiple users of the custodial token platform, where a second address of the second inbound smart contract be configured to receive a second set of one or more crypto tokens, and where the second address corresponds to a user account of the second user on the custodial token platform, deploying, to the blockchain ledger, a batch smart contract configured to control the set of multiple inbound smart contracts, and broadcasting, to the blockchain ledger, a transaction that call the batch smart contract, where the transaction causes a transfer of the first set of one or more crypto tokens of the first inbound smart contract and the second set of one or more crypto tokens of the second inbound smart contract to an outbound address of the custodial token platform.

Another apparatus is described. The apparatus may include means for deploying, to a blockchain ledger, a set of multiple inbound smart contracts including a first inbound smart contract for a first user of a set of multiple users of a custodial token platform, where a first address of the first inbound smart contract is configured to receive a first set of one or more crypto tokens, and where the first address corresponds to a user account of the first user on the custodial token platform and a second inbound smart contract for a second user of the set of multiple users of the custodial token platform, where a second address of the second inbound smart contract is configured to receive a second set of one or more crypto tokens, and where the second address corresponds to a user account of the second user on the custodial token platform, means for deploying, to the blockchain ledger, a batch smart contract configured to control the set of multiple inbound smart contracts, and means for broadcasting, to the blockchain ledger, a transaction that calls the batch smart contract, where the transaction causes a transfer of the first set of one or more crypto tokens of the first inbound smart contract and the second set of one or more crypto tokens of the second inbound smart contract to an outbound address of the custodial token platform.

A non-transitory computer-readable medium storing code is described. The code may include instructions executable by a processor to deploying, to a blockchain ledger, a set of multiple inbound smart contracts including a first inbound smart contract for a first user of a set of multiple users of a custodial token platform, where a first address of the first inbound smart contract be configured to receive a first set of one or more crypto tokens, and where the first address corresponds to a user account of the first user on the custodial token platform and a second inbound smart contract for a second user of the set of multiple users of the custodial token platform, where a second address of the second inbound smart contract be configured to receive a second set of one or more crypto tokens, and where the second address corresponds to a user account of the second user on the custodial token platform, deploying, to the blockchain ledger, a batch smart contract configured to control the set of multiple inbound smart contracts, and broadcasting, to the blockchain ledger, a transaction that call the batch smart contract, where the transaction causes a transfer of the first set of one or more crypto tokens of the first inbound smart contract and the second set of one or more crypto tokens of the second inbound smart contract to an outbound address of the custodial token platform.

In some examples of the method, apparatuses, and non-transitory computer-readable medium described herein, the transfer of the first set of one or more crypto tokens of the first inbound smart contract and the second set of one or more crypto tokens of the second inbound smart contract to the outbound address occurs in a single transaction on the blockchain ledger.

In some examples of the method, apparatuses, and non-transitory computer-readable medium described herein, the transaction causes the transfer of a respective set of one or more crypto token from each of the set of multiple inbound smart contracts.

In some examples of the method, apparatuses, and non-transitory computer-readable medium described herein, deploying the set of multiple inbound smart contracts may include operations, features, means, or instructions for deploying a respective inbound smart contract for each user of the set of multiple users.

Some examples of the method, apparatuses, and non-transitory computer-readable medium described herein may further include operations, features, means, or instructions for determining the set of multiple users for which a respective inbound smart contract may be deployed, where the determination may be based on a level of activity of a respective user of the set of multiple users on the blockchain ledger.

In some examples of the method, apparatuses, and non-transitory computer-readable medium described herein, deploying the set of multiple inbound smart contracts may include operations, features, means, or instructions for deploying a respective clone of an inbound smart contract for each user of the set of multiple users, where each respective clone may be associated with a proxy instance of the inbound smart contract and where the transaction causes the batch smart contract to call a transfer function of each respective clone to cause the transfer.

Some examples of the method, apparatuses, and non-transitory computer-readable medium described herein may further include operations, features, means, or instructions for deploying a new version of the inbound smart contract to the blockchain ledger and updating a proxy contract associated with the proxy instance to reference a smart contract address associated with the new version of the inbound smart contract.

In some examples of the method, apparatuses, and non-transitory computer-readable medium described herein, each of the set of multiple inbound smart contracts includes a hard-coded version of a smart contract address associated with the batch smart contract and the transaction causes the transfer based on each of the set of multiple inbound smart contracts including the hard-coded version of the smart contract address.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary." used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for token management comprising:
    deploying, to a blockchain network comprising a plurality of computing nodes that maintain a blockchain ledger, a plurality of inbound smart contracts, including:
        a first inbound smart contract for a first user of a plurality of users of a custodial token platform, the plurality of users determined based at least in part on a level of activity of a respective user of the plurality of users on the blockchain ledger exceeding a threshold, wherein a first address of the first inbound smart contract is configured to receive a first set of one or more crypto tokens, and wherein the first address corresponds to a user account of the first user on the custodial token platform; and
        a second inbound smart contract for a second user of the plurality of users of the custodial token platform, wherein a second address of the second inbound smart contract is configured to receive a second set of one or more crypto tokens, and wherein the second address corresponds to a user account of the second user on the custodial token platform;
    deploying, to the blockchain ledger, a batch smart contract configured to control the plurality of inbound smart contracts based at least in part on each of the plurality of inbound smart contracts comprising a smart contract controller address that associates a respective inbound smart contract of the plurality of inbound smart contracts to the batch smart contract; and
    broadcasting, to the blockchain ledger, a transaction that calls the batch smart contract, wherein the transaction causes, via a single transaction on the blockchain ledger and after verification of the single transaction by one or more computing nodes of the plurality of computing nodes, a set of state transfers based at least in part on each of the plurality of inbound smart contracts comprising the smart contract controller address, the set of state transfers comprising a first state transfer of the first set of one or more crypto tokens of the first inbound smart contract and a second state transfer of the second set of one or more crypto tokens of the second inbound smart contract to an outbound address of the custodial token platform.

2. The method of claim 1, wherein the transaction causes a transfer of a respective set of one or more crypto token from each of the plurality of inbound smart contracts.

3. The method of claim 1, wherein deploying the plurality of inbound smart contracts comprises:
    deploying a respective inbound smart contract for each user of the plurality of users.

4. The method of claim 1, wherein deploying the plurality of inbound smart contracts comprises:
    deploying a respective clone of an inbound smart contract for each user of the plurality of users, wherein each respective clone is associated with a proxy instance of the inbound smart contract and wherein the transaction causes the batch smart contract to call a transfer function of each respective clone to cause the set of state transfers.

5. The method of claim 4, further comprising:
    deploying a new version of the inbound smart contract to the blockchain ledger; and
    updating a proxy contract associated with the proxy instance to reference a smart contract address associated with the new version of the inbound smart contract.

6. The method of claim 1, wherein:
    the transaction causes the set of state transfers based at least in part on each of the plurality of inbound smart contracts comprising the smart contract controller address.

7. An apparatus, comprising:
    one or more memories storing processor-executable code; and
    one or more processors coupled with the one or more memories and individually or collectively operable to execute the code to cause the apparatus to:
        deploy, to a blockchain network comprising a plurality of computing nodes that maintain a blockchain ledger, a plurality of inbound smart contracts including:
            a first inbound smart contract for a first user of a plurality of users of a custodial token platform, the plurality of users determined based at least in part on a level of activity of a respective user of the plurality of users on the blockchain ledger exceeding a threshold, wherein a first address of the first inbound smart contract be configured to receive a first set of one or more crypto tokens, and wherein the first address corresponds to a user account of the first user on the custodial token platform; and
            a second inbound smart contract for a second user of the plurality of users of the custodial token platform, wherein a second address of the second inbound smart contract be configured to receive a second set of one or more crypto tokens, and wherein the second address corresponds to a user account of the second user on the custodial token platform;
        deploy, to the blockchain ledger, a batch smart contract configured to control the plurality of inbound smart contracts based at least in part on each of the plurality of inbound smart contracts comprising a smart contract controller address that associates a respective inbound smart contract of the plurality of inbound smart contracts to the batch smart contract; and
        broadcast, to the blockchain ledger, a transaction that call the batch smart contract, wherein the transaction causes, via a single transaction on the blockchain ledger and after verification of the single transaction by one or more computing nodes of the plurality of computing nodes, a set of state transfers based at least in part on each of the plurality of inbound smart contracts comprising the smart contract controller address, the set of state transfers comprising a first state transfer of the first set of one or more crypto tokens of the first inbound smart contract and a second state transfer of the second set of one or more crypto tokens of the second inbound smart contract to an outbound address of the custodial token platform.

8. The apparatus of claim 7, wherein the transaction causes a transfer of a respective set of one or more crypto token from each of the plurality of inbound smart contracts.

9. The apparatus of claim 7, wherein, to deploy the plurality of inbound smart contracts, the one or more processors are individually or collectively further operable to execute the code to cause the apparatus to:
deploy a respective inbound smart contract for each user of the plurality of users.

10. The apparatus of claim 7, wherein to deploy the plurality of inbound smart contracts, the one or more processors are individually or collectively further operable to execute the code to cause the apparatus to:
deploy a respective clone of an inbound smart contract for each user of the plurality of users, wherein each respective clone is associated with a proxy instance of the inbound smart contract and wherein the transaction causes the batch smart contract to call a transfer function of each respective clone to cause the set of state transfers.

11. A non-transitory computer-readable medium storing code, the code comprising instructions executable by one or more processors to:
deploy, to a blockchain network comprising a plurality of computing nodes that maintain a blockchain ledger, a plurality of inbound smart contracts, including:
a first inbound smart contract for a first user of a plurality of users of a custodial token platform, the plurality of users determined based at least in part on a level of activity of a respective user of the plurality of users on the blockchain ledger exceeding a threshold, wherein a first address of the first inbound smart contract be configured to receive a first set of one or more crypto tokens, and wherein the first address corresponds to a user account of the first user on the custodial token platform; and
a second inbound smart contract for a second user of the plurality of users of the custodial token platform, wherein a second address of the second inbound smart contract be configured to receive a second set of one or more crypto tokens, and wherein the second address corresponds to a user account of the second user on the custodial token platform;
deploy, to the blockchain ledger, a batch smart contract configured to control the plurality of inbound smart contracts based at least in part on each of the plurality of inbound smart contracts comprising a smart contract controller address that associates a respective inbound smart contract of the plurality of inbound smart contracts to the batch smart contract; and
broadcast, to the blockchain ledger, a transaction that calls the batch smart contract, wherein the transaction causes, via a single transaction on the blockchain ledger and after verification of the single transaction by one or more computing nodes of the plurality of computing nodes, a set of state transfers based at least in part on each of the plurality of inbound smart contracts comprising the smart contract controller address, the set of state transfers comprising a first state transfer of the first set of one or more crypto tokens of the first inbound smart contract and a second state transfer of the second set of one or more crypto tokens of the second inbound smart contract to an outbound address of the custodial token platform.

12. The non-transitory computer-readable medium of claim 11, wherein the transaction causes a transfer of a respective set of one or more crypto token from each of the plurality of inbound smart contracts.

13. The non-transitory computer-readable medium of claim 11, wherein the instructions to deploy the plurality of inbound smart contracts are executable by the one or more processors to:
deploy a respective inbound smart contract for each user of the plurality of users.

14. The non-transitory computer-readable medium of claim 11, wherein the instructions to deploy the plurality of inbound smart contracts are executable by the one or more processors to:
deploy a respective clone of an inbound smart contract for each user of the plurality of users, wherein each respective clone is associated with a proxy instance of the inbound smart contract and wherein the transaction causes the batch smart contract to call a transfer function of each respective clone to cause the set of state transfers.

* * * * *